US007162060B1

(12) United States Patent
Barton et al.

(10) Patent No.: US 7,162,060 B1
(45) Date of Patent: Jan. 9, 2007

(54) METHOD, SYSTEM, AND COMPUTER PROGRAM PRODUCT FOR CONTROL OF PLATEN MOVEMENT DURING A LIVE SCAN

(75) Inventors: Gary Barton, West Palm Beach, FL (US); John F. Carver, Hobe Sound, FL (US); Walter Guy Scott, North Palm Beach, FL (US); Tillman Smith, Tequesta, FL (US)

(73) Assignee: Cross Match Technologies, West Palm Beach, FL (US)

( * ) Notice: Subject to any disclaimer, the term of this patent is extended or adjusted under 35 U.S.C. 154(b) by 0 days.

(21) Appl. No.: 09/425,888

(22) Filed: Oct. 25, 1999

Related U.S. Application Data

(60) Provisional application No. 60/147,498, filed on Aug. 9, 1999.

(51) Int. Cl.
*G06K 9/00* (2006.01)

(52) U.S. Cl. ....................................... 382/126
(58) Field of Classification Search ................ 382/124, 382/126, 127, 313, 314, 315; 340/5.52, 5.53, 340/5.82, 5.83, 356; 358/496, 497, 486, 481, 358/474; 250/234; 128/774; 356/71
See application file for complete search history.

(56) References Cited

U.S. PATENT DOCUMENTS

| 2,500,017 | A | 3/1950 | Altman | 88/57 |
| 3,200,701 | A | 8/1965 | White | 88/14 |
| 3,482,498 | A | 12/1969 | Becker | 95/12 |
| 3,527,535 | A | 9/1970 | Monroe | 356/71 |
| 3,617,120 | A | 11/1971 | Roka | 353/28 |
| 3,699,519 | A | 10/1972 | Campbell | 340/146.3 E |
| 3,947,128 | A | 3/1976 | Weinberger et al. | 356/71 |

(Continued)

FOREIGN PATENT DOCUMENTS

| EP | 0 101 772 A1 | 3/1984 |
| EP | 0 308 162 A2 | 3/1989 |

(Continued)

OTHER PUBLICATIONS

"Command Structure for a Low–Cost (Primitive) Film Scanner," *IBM Technical Disclosure Bulletin*, IBM Corp., vol. 35, No. 7, Dec. 1992, pp. 113–121.

*Fingerprint Scan API Toolkit Version 1.x Feature List* (Apr. 26, 2000) <http://www.mentalix.com/api/archive_fapiv-1.htm>, 3 pages.

(Continued)

*Primary Examiner*—Joseph Mancuso
*Assistant Examiner*—Brian Le
(74) *Attorney, Agent, or Firm*—Sterne Kessler Goldstein & Fox PLLC

(57) ABSTRACT

A method, system, and computer program product is provided that controls platen movement during a live scan. The platen moves in response to finger movement. The present invention then applies a counter force that counters the platen movement. In one embodiment, the counter force has a magnitude which is a function of the speed of the platen movement. The platen can move in a lateral direction (right or left) in response to the finger. The direction in which the counter force is applied is a direction that counters the platen movement in a determined direction. In one example, the force is applied through a motor that drives the platen in a direction opposite the direction of movement caused by the finger or fingers during the live scan. In this way, the counter force which is applied helps prevent a user from moving a finger too rapidly during the live scan. As a result, a high-quality fingerprint image can be obtained with less training and experience in live scan fingerprinting. A user need not follow complicated live scan bars or other indications of a recommended speed or rate of platen movement.

12 Claims, 11 Drawing Sheets

U.S. PATENT DOCUMENTS

| | | | |
|---|---|---|---|
| 3,968,476 A | 7/1976 | McMahon | 340/146.3 E |
| 4,032,975 A | 6/1977 | Malueg et al. | 358/213 |
| 4,063,226 A | 12/1977 | Kozma et al. | 365/125 |
| 4,210,899 A | 7/1980 | Swonger et al. | 340/146.3 E |
| 4,414,684 A | 11/1983 | Blonder | 382/4 |
| 4,537,484 A | 8/1985 | Fowler et al. | 354/62 |
| 4,544,267 A | 10/1985 | Schiller | 356/71 |
| 4,601,195 A | 7/1986 | Garritano | 73/60 |
| 4,669,487 A * | 6/1987 | Frieling | 33/512 |
| 4,681,435 A | 7/1987 | Kubota et al. | 356/71 |
| 4,783,823 A | 11/1988 | Tasaki et al. | 382/4 |
| 4,784,484 A | 11/1988 | Jensen | 356/71 |
| 4,792,226 A | 12/1988 | Fishbine et al. | 356/71 |
| 4,811,414 A | 3/1989 | Fishbine et al. | 382/52 |
| 4,876,726 A | 10/1989 | Capello et al. | 382/4 |
| 4,924,085 A | 5/1990 | Kato et al. | 250/227.28 |
| 4,933,976 A | 6/1990 | Fishbine et al. | 382/4 |
| 4,942,482 A * | 7/1990 | Kakinuma et al. | 355/25 |
| 4,995,086 A | 2/1991 | Lilley et al. | 382/4 |
| 5,054,090 A | 10/1991 | Knight et al. | 382/4 |
| 5,067,162 A | 11/1991 | Driscoll, Jr. et al. | 382/5 |
| 5,067,749 A | 11/1991 | Land | 283/117 |
| 5,131,038 A | 7/1992 | Puhl et al. | 380/23 |
| 5,146,102 A | 9/1992 | Higuchi et al. | 250/556 |
| 5,187,747 A | 2/1993 | Capello et al. | 382/4 |
| 5,222,152 A | 6/1993 | Fishbine et al. | 382/2 |
| 5,230,025 A | 7/1993 | Fishbine et al. | 382/4 |
| 5,233,404 A | 8/1993 | Lougheed et al. | 356/71 |
| 5,249,370 A | 10/1993 | Stanger et al. | 34/22 |
| 5,253,085 A * | 10/1993 | Maruo et al. | 358/481 |
| D348,445 S | 7/1994 | Fishbine et al. | D14/107 |
| D351,144 S | 10/1994 | Fishbine et al. | D14/107 |
| 5,384,621 A | 1/1995 | Hatch et al. | 355/204 |
| 5,412,463 A | 5/1995 | Sibbald et al. | 356/71 |
| 5,416,573 A | 5/1995 | Sartor, Jr. | 356/71 |
| 5,467,403 A | 11/1995 | Fishbine et al. | 382/116 |
| 5,469,506 A | 11/1995 | Berson et al. | 380/23 |
| 5,473,144 A | 12/1995 | Mathurin, Jr. | 235/380 |
| 5,509,083 A | 4/1996 | Abtahi et al. | 382/124 |
| 5,517,528 A | 5/1996 | Johnson | 375/259 |
| 5,528,355 A | 6/1996 | Maase et al. | 356/71 |
| 5,548,394 A | 8/1996 | Giles et al. | 356/71 |
| 5,591,949 A | 1/1997 | Bernstein | 235/380 |
| 5,596,454 A | 1/1997 | Hebert | 359/726 |
| 5,598,474 A | 1/1997 | Johnson | 380/23 |
| 5,613,014 A | 3/1997 | Eshera et al. | 382/124 |
| 5,615,277 A | 3/1997 | Hoffman | 382/115 |
| 5,625,448 A | 4/1997 | Ranalli et al. | 356/71 |
| 5,640,422 A | 6/1997 | Johnson | 375/259 |
| 5,649,128 A | 7/1997 | Hartley | 395/309 |
| 5,650,842 A | 7/1997 | Maase et al. | 356/71 |
| 5,661,451 A | 8/1997 | Pollag | 340/426 |
| 5,680,205 A | 10/1997 | Borza | 356/71 |
| 5,689,529 A | 11/1997 | Johnson | 375/259 |
| 5,717,777 A | 2/1998 | Wong et al. | 382/124 |
| 5,745,684 A | 4/1998 | Oskouy et al. | 395/200.8 |
| 5,748,766 A | 5/1998 | Maase et al. | 382/124 |
| 5,755,748 A | 5/1998 | Borza | 607/61 |
| 5,778,089 A | 7/1998 | Borza | 382/124 |
| 5,781,647 A | 7/1998 | Fishbine et al. | 382/1 |
| 5,793,218 A | 8/1998 | Oster et al. | 324/754 |
| 5,805,777 A | 9/1998 | Kuchta | 395/112 |
| 5,812,067 A | 9/1998 | Bergholz et al. | 340/825.31 |
| 5,815,252 A | 9/1998 | Price-Francis | 356/71 |
| 5,818,956 A | 10/1998 | Tuli | 382/126 |
| 5,822,445 A | 10/1998 | Wong | 382/127 |
| 5,825,005 A | 10/1998 | Behnke | 235/380 |
| 5,825,474 A | 10/1998 | Maase | 356/71 |
| 5,828,773 A | 10/1998 | Setlak et al. | 382/126 |
| 5,832,244 A | 11/1998 | Jolley et al. | 395/309 |
| 5,848,231 A | 12/1998 | Teitelbaum et al. | 395/186 |
| 5,859,420 A | 1/1999 | Borza | 250/208.1 |
| 5,862,247 A | 1/1999 | Fisun et al. | 382/116 |
| 5,867,802 A | 2/1999 | Borza | 701/35 |
| 5,869,822 A | 2/1999 | Meadows, II et al. | 235/380 |
| 5,872,834 A | 2/1999 | Teitelbaum | 379/93.03 |
| 5,900,993 A | 5/1999 | Betensky | 359/710 |
| 5,907,627 A | 5/1999 | Borza | 382/124 |
| 5,920,384 A * | 7/1999 | Borza | 356/71 |
| 5,920,640 A | 7/1999 | Salatino et al. | 382/124 |
| 5,928,347 A | 7/1999 | Jones | 710/129 |
| 5,960,100 A | 9/1999 | Hargrove | 382/124 |
| 5,973,731 A | 10/1999 | Schwab | 348/161 |
| 5,974,162 A | 10/1999 | Metz et al. | 382/124 |
| 5,987,155 A | 11/1999 | Dunn et al. | 382/116 |
| 5,995,014 A | 11/1999 | DiMaria | 340/825.31 |
| 6,018,739 A | 1/2000 | McCoy et al. | 707/102 |
| 6,023,522 A | 2/2000 | Draganoff et al. | 382/124 |
| 6,041,372 A | 3/2000 | Hart et al. | 710/62 |
| 6,064,779 A * | 5/2000 | Neukermans et al. | 358/412 |
| 6,075,876 A | 6/2000 | Draganoff | 382/124 |
| 6,078,265 A | 6/2000 | Bonder et al. | 340/825.31 |
| 6,088,585 A | 7/2000 | Schmitt et al. | 455/411 |
| 6,104,809 A | 8/2000 | Berson et al. | 380/23 |
| 6,122,394 A * | 9/2000 | Neukermans et al. | 356/71 |

FOREIGN PATENT DOCUMENTS

| | | |
|---|---|---|
| EP | 0 379 333 A1 | 7/1990 |
| EP | 0 623 890 A2 | 11/1994 |
| EP | 0 379 333 B1 | 7/1995 |
| EP | 0 889 432 A2 | 1/1999 |
| EP | 0 905 646 A1 | 3/1999 |
| EP | 0 924 656 A2 | 6/1999 |
| GB | 2 089 545 A | 6/1982 |
| GB | 2 313 441 A | 11/1997 |
| WO | WO 87/02491 | 4/1987 |
| WO | WO 90/03620 | 4/1990 |
| WO | WO 92/11608 | 7/1992 |
| WO | WO 94/22371 | 10/1994 |
| WO | WO 96/17480 | 6/1996 |
| WO | WO 97/29477 | 8/1997 |
| WO | WO 97/41528 A1 | 11/1997 |
| WO | WO 98/09246 A1 | 3/1998 |
| WO | WO 98/12670 | 3/1998 |
| WO | WO 99/12123 | 3/1999 |
| WO | WO 99/26187 A1 | 5/1999 |
| WO | WO 99/40535 | 8/1999 |

OTHER PUBLICATIONS

*Global Security Fingerscan™ System Overview* (visited Jan. 11, 2000). <http://wwwu-net.com/mbp/sol/g/a9.htm>, 12 pages.

"Image Acquisition System," *IBM Technical Disclosure Bulletin*, IBM Corp., vol. 29, No. 5, Oct. 1986, pp. 1928–1931.

Kunzman, Adam J. and Wetzel, Alan T., "1394 High Performance Serial Bus: The Digital Interface for ATV," *IEEE Transaction on Consumer Electronics*, IEEE, vol. 41, No. 3, Aug. 1995, pp. 893–900.

*Mentalix Provides The First IAFIS–Certified Latent Print Scanning Solution For Windows* (Jul. 23, 1999) <http://www.mentalix.com/pressreleases/fprintlook3_prel.htm>, 2 pages.

Sluijs, F. et al., "an On–chp USB–powered Three–Phase Up/down DC/DC Converter in a Standard 3.3V CMOS Process," *2000 IEEE International Solid–State Circuits Conference*, IEEE, Feb. 9, 2000, pp. 440–441.

Venot, A. et al., "Automated Comparison of Scintigraphic Images," *Journal of Nuclear Medicine,* vol. 27, No. 8, Aug. 1986, pp. 1337–1342.

EPO Patent Abstract for Japanese Patent Publication No. 59–103474, published Jun. 14, 1984, 1 page.

EPO Patent Abstract for Japanese Patent Publication No. 10–262071, published Sep. 29, 1998, 1 page.

EPO Patent Abstract for Japanese Patent Publication No. 11–167630, published Jun. 22, 1999, 1 page.

EPO Patent Abstract for Japanese Patent Publication No. 11–252489, published Sep. 17, 1999, 1 page.

*Cross Match Technologies, Inc.—Commerical Systems: Building On The Standard* (visited Mar. 25, 1999) <http://www.crossmatch.net/new/commercial/commercial–index.html>, 2 pages.

*Cross Match Technologies, Inc. —International Sales* (visited Mar. 25, 1999) <http://www.crossmatch.net/new/sales/sales–index.html>, 1 page.

*Cross Match Technologies, Inc.—Support* (visited Mar. 25, 1999) <http://www.crossmatch.net/new/support/support–index.html>, 1 page.

*Cross Match Technologies, Inc.—News—Press Releases—Verifier 400 Press Release* (visited Mar. 25, 1999) <http://www.crossmatch.net/new/news/news–pr–050798.html>, 1 page.

10–Print Imaging System, Cross Check Corporation, 2 pages, 1998.

*Cross Match Tecnologies. Inc.* (visited Mar. 25, 1999) <http://www.crossmatch.net/>, 1 page.

*Cross Match Technologies, Inc. —Products Overview* (visited Mar. 25, 1999) <http://www.crossmatch.net/new/products/products–index.html>, 1 page.

*Cross Match Technologies, Inc.—Law Enforcement Systems* (visited Mar. 25, 1999) <http://www.crossmatch.net/new/law/law–index.html>, 2 pages.

Verifier™ 200 Fingerprint Capture Devices, Cross Match Technologies, Inc., 2 pages, 1996–1997.

Verifier 200 Direct Fingerprint Reader, Cross Check Corporation, 2 pages, 1996–1997.

Verifier™ 250 Fingerprint Capture Devices, Cross Match Technologies, Inc., 2 pages, 1996–1997.

Verifier 250 Small Footprint Direct Fingerprint Reader, Cross Check Corporation, 2 pages, 1996–1997.

Verifier™ 290 Fingerprint Capture Devices, Cross Match Technologies, Inc., 2 pages, 1996–1997.

Verifier 290 Direct Rolled Fingerprint Reader, Cross Check Corporation, 2 pages, 1996–1997.

Verifier™ 500 Fingerprint Capture Devices, Cross Match Technologies, Inc., 2 pages, 1998.

Biometric terminal, 1 page.

*Digital Descriptor Systems, Inc.–Profile* (visited Nov. 17, 1999) <http://www.ddsi–cpc.com/pages/profile.html>, 3 pages.

*Press Release: Printrak International Announces New Portable Fingerprint ID Solution,* Dec. 10, 1996, (visited Nov. 17, 1999) <http://www.scott.net/~dg/25.htm>, 3 pages.

*Corporate Profile* (visited Nov. 17, 1999) <http://www.printrackinternational.com/corporate.htm>, 1 page.

*Printrak Products* (visited Nov. 17, 1999). <http://www.printrackinternational.com/Products.htm>, 1 page. (Discuss technology as early as 1974).

*Sony Fingerprint Indentification Unit* (visited Nov. 17, 1999). <http://www.iosoftware.com/biosols/sony/fiu/index.htm>, 3 pages.

*Fujitsu Fingerprint Recognition Device (FPI–550)* (visited Nov. 17, 1999). <http://www.iosoftware.com/biosols/fujitsu/fpi550.htm>, 2 pages.

*Mitsubishi MyPass LP–1002* (visited Nov. 17, 1999). <http://www.iosoftware.com/biosols/mitsubishi/mypass.htm>, 2 pages.

*SecureTouch PV—A Personal Password Vault* (visited Nov. 17, 1999) <http://www.biometricacess.com/securetouch_pv.htm>, 1 page.

*Secugen Unveils Fully Functional Fingerprint Recognition Solutions,* May 11, 1999, (visited Nov. 17, 1999) <http://www.secugen.com/pressrel.htm>, 3 pages.

*POLLEX Technology Ltd., The Expert in Fingerprint Identification—POLLog* (visited Nov. 17, 1999) <http://www-.pollex.ch/english/products/pollog.htm>, 2 pages.

*Sony Fingerprint Identification Terminal* (visited Nov. 17, 1999). <http://www.iosoftware.com/biosols/sony/fiu/applicaitons.fit100.htm>, 2 pages.

*Sony Fingerprint Identification Unit (FIU–700)* (visited Nov. 17, 1999). <http://www.iosoftware.com/biosols/sony/fiu70/index.htm>, 2 pages. (Unit available late 1999).

*Series 500/600 Scanners* (visited Nov. 17, 1999) <http://www.ultra–scan.com/500.htm>, 3 pages. (Scanner released in 1996).

*Series 700 ID Station* (visited Nov. 17, 1999) <http://www.ultra–scan.com/700.htm>, 3 pages. (Scanner released in 1998).

*Identix: The Corporation* (visited Nov. 17, 1999) <http://www.identix.com/corporate/home.htm>, 2 pages, Copyright 1996–1998.

*Biometric Imaging Products* (visited Nov. 17, 1999) <http://www.identix.com/products/bioimage.htm>, 1 page, Copyright 1996–1998.

*TouchPrint™ 600 Live–Scan System* (visited Nov. 17, 1999) <http://www.identix.com/products/livescan.htm>, 4 pages, Copyright 1996–1998.

*TouchPrint™ 600 Palm Scanner* (visited Nov. 17, 1999) <http://www.identix.com/products/palmscan.htm>, 3 pages, Copyright 1996–1998.

*TouchPrint™ 600 Card Scan System* (visited Nov. 17, 1999) <http://www.identix.com/products/cardscan.htm>, 3 pages, Copyright 1996–1998.

*DERMALOG Key—The safest and easiest way of access control* (Last updated Jul. 18, 1998) <http://www.dermalog.de/Britain/Products/Key/key.htm>, 1 page.

*DERMALOG Finger–ID Your small size solution for high security* (Last updated Jul. 18, 1998) <http://www.dermalog.de/Britain/Products/Finger/fingerid.htm>, 1 page.

*Mytec: Corporate* (visited Nov. 17, 1999) <http://www-.mytec.com/corporate/>, 2 pages.

*Kinetic Sciences Inc. Fingerprint Biometrics Division* (visited Nov. 17, 1999) <http://www.kinetic.bc.ca/main–FP-B.html>, 1 page.

*Fingerprint Biometrics: Securing The Next Generation,* May 19, 1999, (visited Nov. 17, 1999) <http://www.secugen.com/pressrel.htm>, 2 pages.

*DBI Live–Scan Products: Image Printer Stations* (visited Nov. 17, 1999) <http://www.digitalbiometrics.com/products/imageprinter.htm>, 2 pages.

*DBI Live–Scan Products: FC–21 Fingerprint Capture Station* (visited Nov. 17, 1999) <http://www.digitalbiometrics.com/products/Fingerprintcapture.htm>, 2 pages.

*Series 400 OEM Scanner* (visited Nov. 17, 1999) <http://www.ultra–scan.com/400.htm>, 3 pages. (Scanner released in 1996).

*USC Scanner Design* (visited Nov. 17, 1999) <http://www.ultra–scan.com/scanner.htm>, 4 pages. (Scanner released in 1996).

*Time is Money!* (visited Jun. 5, 1998) <http://www.iaus.com/afim.htm>, 3 pages.

*LS 1 LiveScan Booking Workstation High Performance Finger & Palm Scanning System* (visited Jun. 4, 1998) <http://www.hbs–jena.com/ls1.htm>, 6 pages, Copyright 1998.

*Welcome to the Homepage of Heimann Biometric Systems GMBH* (visited Jun. 4, 1998) <http://www.hbs–jena.com/>, 1 page, Copyright 1998.

*Heimann Biometric Systems Corporate Overview* (visited Jun. 4, 1998) <http://www.hbs–jena.com/company.htm>, 4 pages, Copyright 1998.

*Remote Access Positive IDentification—raPID* (visited Jun. 3, 1998) <http://www.nec.com. . . >, 2 pages, Copyright 1997.

*Morpho DigiScan Cellular* (visited Jun. 3, 1998). <http://www.morpho.com/products/law_enforcement/digiscan/cellular.htm>, 2 pages, Copyright 1998.

*A. F. I. S.* (last updated April 4, 1998) <http://www.dermalog.de/afis.htm>, 2 pages.

*Morpho FlexScan Workstation* (visited Jun. 3, 1998). <http://www.morpho.com/products/law_enforcement/flexscan/>, 2 pages, Copyright 1998.

True–ID® The LiveScan with special "ability". . . , 2 pages.

*Printrak International: User List* (visited Jun. 3, 1998) <http://www.printrakinternational.com and links>, 10 pages, Copyright 1996.

*Live–Scan Products: Tenprinter® 1133S* (visited Apr. 23, 1999). <http://www.digitalbiometrics.com/Products/tenprinter.htm>, 4 pages. (Tenprinter 1133S released in 1996).

*TouchPrint™ 600 Live–Scan System* (visited Apr. 23, 1999) <http://www.identix.com/products/livescan.htm>, 4 pages, Copyright 1996–1998.

Systems for Live–Scan Fingerprinting, Digital Biometrics, Inc., 8 pages, Copyright 1998.

DBI FingerPrinter CMS, Digital Biometrics, Inc., 5 pages. (CMS released in 1998).

Fingerscan V20, Identix Incorporated, 1 page, Copyright 1999.

Verid Fingerprint Reader, TSSI, 4 pages.

Response to Request for Information, Cross Match Tecnologies, Inc., 12 pages, Apr. 14, 1999.

*Startek's Fingerprint Verification Products* (visited Nov. 17, 1999) <http://www.startek.com/tw/product/index.html>, 1 page.

*Introduction to Startek's Fingerprint Verification Products* (visited Nov. 17, 1999) <http://www.startek.com.tw/product/index2.html>, 2 pages.

*Automatic Fingerprint Identification Systems* (visited Nov. 17, 1999) <http://www.sagem.com/en/produit4–en/empreinte–dig–en.htm>, 1 page.

*Digital Biometrics Corporate Information* (visited Nov. 17, 1999) <http://www.digitalbiometrics.com/Corporate_info/Corporate_info.htm>, 2 pages. (discusses technology as early as 1985).

*DBI Live–Scan Products: Digital Biometrics Tenprinter* (visited Nov. 17, 1999) <http://www.digitalbiometrics.com/products/tenprinter.htm>, 4 pages. (Tenprinter released in 1996).

*DBI Live–Scan Products: Networking Options* (Visited Nov. 17, 1999) <http://www.digitalbiometrics.com/products/networking_options.htm>, 3 pages.

*DBI Live–Scan Products: Digital Biometrics FingerPrinter CMS* (visited Nov. 17, 1999) <http://www.digitalbiometrics.com/products/FingerPrinterCMS.htm>, 3 pages. (CMS released in 1998).

Randall, N. "A Serial Bus on Speed," *PC Magazine,* May 25, 1999, pp. 201–203.

*The DERMALOG Check–ID* (visited Nov. 12, 1999) <http://www.dermalog.de/ganzneu/products_check.html>, 1 page.

*Check–ID Specifications and Features* (visited Nov. 12, 1999) <http://www.dermalog.de/ganzneu/spec_check.html>, 1 page, Copyright 1999.

*Startek's Fingerprint Verification Products: FingerFile 1050* (visited Oct. 8, 1999) <http://www.startek.com.tw/product/ff1050.html>, 3 pages.

*Veriprint2000 Fingerprint Verification Terminal For Use With Jantek Time & Attendance Software* (visited May 17, 1999) <http://www.hunterequipment.com/fingerprint.htm>, 2 pages.

*Veriprint Product Applications* (visited Apr. 27, 1999) <http://www.biometricid.com/uses.htm>, 1 page, Copyright 1999.

*BII Home Page* (visited Apr. 27, 1999) <http://www.biometricid.com/homepage.htm>, 1 page, Copyright 1999.

*Veriprint 2100 Stand–Alone Fingerprint Verification Terminal* (visited Apr. 27, 1999) <http://www.biometricid.com/veriprint2100.htm>, 3 pages.

*Access Control System Configurations* (visited May 20, 1999) <http://www.intelgate.com/access.htm>, 2 pages. (Ver–i–fus product released in 1995).

*Company* (visited May 17, 1999) <http://www.instainfo.com.company.htm>, 2 pages.

*TouchLock™ II Fingerprint Identity Verification Terminal* (visited May 17, 1999). <http://www.identix.com/TLock.htm>, 4 pages.

*Physical Security and Staff Tracking Solutions* (visited May 17, 1999) <http://www.identix.com/products/biosecurity.html>, 3 pages, Copyright 1996–1998.

*Intelnet Inc.* (visited May 20, 1999) <http://www.intelgate.com/index.html>, 1 page, Copyright 1996.

*Ver–i–Fus Fingerprint Access Control System* (visited May 20, 1999) <http://www.intelgate.com/verifus.htm>, 2 pages. (Ver–i–fus product released in 1995).

*Ver–i–fus® Configurations* (visited May 20, 1999) <http://www.intelgate.com/verconfig.htm>, 1 page. (Ver–i–fus product released in 1995).

*Ver–i–Fus® & Ver–i–Fus$^{mil}$®* (visited May 20, 1999) <http://www.intelgate.com/vif_data.htm>, 3 pages. (Ver–f–fus product released in 1995).

*Mytec Technologies Touchstone Pro: Features,* (visited Apr. 27, 1999) <http://www.mytec.com/Products/Touchstone/features.htm>, 1 page.

*Electronic Timeclock Systems and Biometric Readers* (last updated Apr. 17, 1999) <http://www.lfs–hr–bene.com/tclocks.html>, 1 page.

*Fingerprint Time Clock* (visited May 17, 1999) <http://www.lfs–her–bene.com/Biometrics/Fingerprintclock.html>, 6 pages.

*KC–901: The KSI fingerprint sensor* (visited May 17, 1999) <http://www.kinetic.bc.ca/kc–901.html>, 3 pages.

*SonyDCam* (visited May 20, 1999) <http://www.micrsoft.com/DDK/ddkdocs/Win2k/sonydcam.htm>, 3 pages, Copyright 1999.

*Verid Fingerprint Verification* (visited May 17, 1999) <http://www.tssi.co.uk/products/finger.html>, 2 pages.

*Startek's Fingerprint Verification Products: Fingerguard FG–40* (visited May 18, 1999) <http://www.startek.com.tw/product/fg40/fg40.html>, 3 pages.

*SAC Technologies Showcases Stand–Alone SAC–Remote(TM)* (visited May 18, 1999) <http://www.pathfinder.com/money/latest/press/PW/1998Mar25/1026.html>, 2 pages.

"Biometrics, The Future Is Now," www.securitymagazine.com, May 1999, pp. 25–26.

*Mytec Technologies Gateway,* (visited Apr. 27, 1999) <http://www.mytec.com/Products/gateway/>, 1 page.

*Mytec Technologies Gateway: Features & Benefits,* (visited Apr. 27, 1999) <http://www.mytec.com/Products/gateway/feautres.htm>, 1 page.

*Mytec Technologies Touchstone Pro,* (visited Apr. 27, 1999) <http://www.mytec.com/Products/Touchstone/>, 1 page.

*Ultra–Scan Corporation Home Page* (visited May 20, 1999) <http://www.ultra–scan.com/index.htm>, 3 pages. (discusses technology as early as 1996).

*Profile* (last updated Aug. 16, 1998) <http://www.dermalog.de/Britain/Profile/profile.htm>, 3 pages. (discusses technology as early as 1990).

*ID–Card System Technical Specifications* (last updated Jul. 18, 1998) <http://dermalog.de/Britain/Products/ID–Card/idcard2.htm>, 2 pages.

*Fujitsu Limited Products and Services* (updated Apr. 21, 1999) <http://www.fujitsu.co.jp/hypertext/Products/index–e.html>, 3 pages, Copyright 1995–1999.

Btt (Biometric Technology Today), Finger technologies contacts, 2 pages.

Drake, M.D. et al., "Waveguide hologram fingerprint entry device," *Optical Engineering,* vol. 35, No. 9, Sep. 1996, pp. 2499–2505.

Roethenbaugh, G. (ed.), *Biometrics Explained,* 1998, ICSA, pp. 1–34.

*Automated Identification Systems* (visited May 20, 1999) <http://www.trw.com/idsystems/bldgacess2.html>, 1 page, Copyright 199.

Patent Abstracts of Japan, Publication No. 10079017, Publication Date: Mar. 24, 1998, Inventor: Ishii Tsutomu, Title: Device for Collecting Fingerprint and Palmprint.

\* cited by examiner

METHOD, SYSTEM, AND COMPUTER PROGRAM PRODUCT FOR CONTROL OF PLATEN MOVEMENT DURING A LIVE SCAN

This application claims the benefit of priority under 35 U.S.C. §119(e) to Appl. No. 60/147,498, filed Aug. 9, 1999, which is incorporated in its entirety herein by reference.

CROSS-REFERENCE TO RELATED APPLICATIONS

This patent application is potentially related to the following co-pending U.S. utility patent applications:

1. "System and Method for Transferring a Packet with Position Address and Line Scan Data Over an Interface," Ser. No. 09/925,949, by W. Scott et al., filed concurrently herewith and incorporated in its entirety herein by reference;
2. "Adjustable, Rotatable Finger Guide in a Tenprint Scanner with Movable Prism Platen," Ser. No. 09/422,937, by J. Carver et al., filed Oct. 22, 1999, and incorporated in its entirety herein by reference;
3. "Calibration and Correction in a Fingerprint Scanner," Ser. No. 09/425,947, by R. Irving et al., filed concurrently herewith and incorporated in its entirety herein by reference; and
4. "Method, System, and Computer Program Product for a GUI to Fingerprint Scanner Interface," Ser. No. 09/429,958, by C. Martinez et al., filed concurrently herewith and incorporated in its entirety herein by reference.

BACKGROUND OF THE INVENTION

1. Field of the Invention

The present invention pertains to biometric technology, and in particular, to fingerprint scanning.

2. Related Art

Biometrics is a science involving the analysis of biological characteristics. Biometric imaging captures a measurable characteristic of a human being for identity purposes. Fingerprint capture and recognition is an important biometric technology. Law enforcement, banking, voting, and other industries increasingly rely upon fingerprints as a biometric to store, recognize or verify identity. See, e.g., Gary Roethenbaugh, *Biometrics Explained*, International Computer Security Association, Inc., pp. 1–34, (1998), which is incorporated herein by reference in its entirety.

One type of biometric identification system that uses fingerprint imaging is an Automatic Fingerprint Identification System (AFIS). Automatic Fingerprint Identification Systems are used for law enforcement purposes. Law enforcement personnel collect fingerprint images from criminal suspects when they are arrested. In this case, a suspect's finger or fingers are imaged in a live scan. Law enforcement personnel also collect fingerprint images from crime scenes. These are known as latent prints. Ten-print scanners are a common type of AFIS system. Ten-print scanners produce forensic-quality ten-print records of rolled and plain impression fingerprint images.

In conventional fingerprint scanners, one or more fingers are placed in an imaging area. An illumination source illuminates the underside of finger(s). An image representative of valleys, ridges, and other minutiae of a fingerprint is then detected by an image sensor, such as, a solid-state camera. Fingerprint scanners use a surface of a platen as the imaging area.

In a live scan, one or more fingers are placed on the outer surface of the platen. Different types of fingerprint images often need to be detected depending upon a particular application. For example, a flat print consists of a fingerprint image of a digit (finger or thumb) pressed flat against the platen. A roll print consists of an image of a digit (finger or thumb) made while the digit (finger or thumb) is rolled from one side of the digit to another side of the digit over the surface of the platen. A slap print consists of an image of four flat fingers pressed flat against the platen.

In many fingerprint scanner systems, the platen is held in stationary position during a live scan. The optical imaging area which is detected at a given moment is the area where light from an illumination beam can reflect from the platen to the detector. A stationary platen generally needs to have a large optical imaging area to capture an adequate range of fingerprint images. As a result, a stationary platen requires a large imaging surface and a large area camera. This increases component cost and size. This is especially true for ten-print scanners such as those used with AFIS systems which need to capture individual flat prints, roll prints, and slap prints. Thus, a stationary platen is typically used in custom-made consoles that are expensive and large.

What is needed is a fingerprint scanner having a platen that moves relative to an optical imaging area of a detector. Because the movable platen can move, the optical imaging area and associated detector can be relatively small. Thus, a smaller platen and smaller camera, such as a linear sensor, can be used which reduces cost and size. See, e.g., the commonly-owned, co-pending U.S. patent application by W. Scott, entitled "Individualized Fingerprint Scanner," Appl. No. 09/067,792 filed Apr. 28, 1999, incorporated herein in its entirety by reference.

A movable platen, however, can present problems during a live scan. In particular, during a live scan to take a roll print, a finger must generally roll at an accurate rate of rotation over an optical reading or imaging area. In this case, because of friction with the finger, the movable platen moves as the finger rolls. If the finger rotates too fast, then data is lost, requiring the procedure to be conducted again. Similarly, during a slap print, four fingers are placed on a platen and then moved in unison laterally across an optical reading or imaging area. If the fingers move too fast, then data is lost, requiring the procedure to be conducted again. In addition, rapid movement of a platen during a live scan (roll print or slap print) can lead to unnecessary wear or even damage at excessive speeds.

SUMMARY OF THE INVENTION

The present invention provides a method, system, and computer program product for control of platen movement during a live scan. At the start of a live scan, one or more fingers are placed on a movable platen. A user then rolls or slides a finger. The platen, in frictional contact with the finger, moves in response to the finger movement. The present invention then applies a counter force that counters the platen movement. In this way, the counter force which is applied helps prevent a user from moving a finger too rapidly during the live scan. As a result, a high-quality fingerprint image can be obtained with less training and experience in live scan fingerprinting. A user need not follow complicated live scan bars or other indications of a recommended speed or rate of platen movement.

In one embodiment of the present invention, the counter force has a magnitude which is a function of the speed of the platen movement. The platen can move in a lateral direction (right or left) in response to the finger. The direction in which the counter force is applied is a direction that counters the platen movement in a determined direction. In one example, the force is applied through a motor that drives the platen in a direction opposite the direction of movement caused by the finger or fingers during the live scan.

In one embodiment, a method is provided that controls platen movement during a live scan. The method includes determining the speed of platen movement, determining the direction of platen movement, and applying a counter force having a magnitude which is a function of the determined platen movement speed.

In one example, the speed determining step comprises reading a time interval count in response to receiving a position incremental signal. The platen direction determining step comprises reading a Boolean value set in response to a direction of platen movement along an axis perpendicular to the tip-to-crease direction of a fingerprint.

Several alternative examples are provided to apply a counter force. First, the applying step can include applying a counter force having a magnitude which is an approximately exponential function or an exponential function of the determined platen movement speed. Second, the applying step can include applying a counter force having a magnitude which is an approximately linear function or a linear function of the determined platen movement speed.

In one example, a range of the determined platen movement speed (preferably, corresponding to a range in which a counter force can be applied) is subdivided into n sub-divisions, where n is a whole number equal to or greater than 2. The magnitude of counter force which can be applied is determined based on n respective linear functions, each of the n functions having a different slope such that the slopes of the n functions increase across the range of platen movement speed. In one implementation, the determined platen movement speed has a range in which a counter force can be applied that is subdivided into first through fourth sub-divisions. The magnitude of counter force which can be applied is then determined based on first through fourth respective linear functions. Each of the first through fourth functions has a different slope such that the slopes of the first through fourth functions increase across the range of platen movement speed at an approximately exponential function.

In one example, the applying step comprises the steps of: when the determined platen movement speed is in a first range, calculating a drive value equal to the difference between a maximum threshold and the read time interval count divided by 16 plus a mid-position bias offset; when the determined platen movement speed is in a second range, calculating a drive value equal to the difference between a maximum threshold and the read time interval count divided by 12 plus a mid-position bias offset; when the determined platen movement speed is in a third range, calculating a drive value equal to the difference between a maximum threshold and the read time interval count divided by 10 plus a mid-position bias offset; and when the determined platen movement speed is in a fourth range, calculating a drive value equal to the difference between a maximum threshold and the read time interval count divided by 8 plus a mid-position bias offset.

Further features of this method include detecting whether the determined speed is above a minimum threshold and performing the counter force applying step only when the determined speed is above a minimum threshold. In this way, velocity control of platen movement is not carried out at a de minimus level which avoids dithering and unnecessary movement. Among other things, the force applying step can include generating a single supply drive signal having a voltage which is a function of a time interval count and a direction opposing the platen movement. The force applying step can also include applying a braking pressure in any direction that slows or resists platen movement speed. This direction can include, but is not limited to, applying force in an opposite direction.

In another embodiment, a motion control system controls platen movement during a live scan. The direction and speed of the movement is initiated in response to movement of a finger during the live scan. This system includes a platen movement control module, a digital to analog converter, and single supply amplifier. The platen movement control module generates a single supply drive value having a digital value which is a function of the speed of platen movement and a direction opposing the platen movement. The digital to analog converter receives the single supply drive value and outputs a single supply drive voltage signal and a fixed reference voltage signal. The single supply drive voltage signal has a voltage which is a function of the speed of platen movement and a direction opposing the platen movement. The fixed reference voltage signal has a voltage that establishes a mid-position bias offset. The single supply amplifier then amplifies the single supply voltage drive signal to produce two motor drive signals that can create a voltage difference across a motor which is a function of the speed of platen movement and a direction opposing the platen movement.

In one embodiment, the single supply drive value has a digital value which is an approximately exponential function or an exponential function of the speed of platen movement and the direction opposing the platen movement. In another embodiment, the single supply drive value has a digital value which is an approximately linear function or a linear function of the speed of platen movement and the direction opposing the platen movement.

In one example implementation, in response to receipt of a position incremental signal, the platen movement control module reads a time interval count and checks a Boolean value set to indicate a direction of platen movement along an axis perpendicular to the tip-to-crease direction of a fingerprint. The single supply drive value has a digital value which is determined based on n respective linear functions, n being a whole number equal to or greater than one. Each of the n functions has a different slope such that the slopes of the n functions increase across the range of platen movement speed. For example, when the determined platen movement speed is in a first range, the platen movement control module calculates a drive value having a magnitude equal to the difference between a maximum threshold and the read time interval count, divided by 16, plus a mid-position bias offset. When the determined platen movement speed is in a second range, the platen movement control module calculates a drive value having a magnitude equal to the difference between a maximum threshold and the read time interval count, divided by 12, plus a mid-position bias offset. When the determined platen movement speed is in a third range, the platen movement control module calculates a drive value having a magnitude equal to the difference between a maximum threshold and the read time interval count, divided by 10, plus a mid-position bias offset. Finally, when the determined platen movement speed is in a fourth range, the platen movement control module calculates a drive value having a magnitude equal to the difference between a maximum threshold and the read time interval count, divided by 8, plus a mid-position bias offset.

According to one embodiment of the present invention, a fingerprint scanner includes a platen that moves along a lateral directional axis in response to movement of a finger during a live scan. The direction and speed of the platen movement is initiated in response to movement of the finger during the live scan.

A motor is coupled to drive the platen along the lateral directional axis. A position encoder outputs a position increment signal indicative of an incremental movement of the platen and a direction signal indicative of the direction of the platen movement. A counter generates a count of periodic clock signals representing a time interval. A Boolean register is set in response to the direction signal to a Boolean value indicating the direction of the platen movement. A platen movement control module generates a single supply drive value having a digital value which is a function of the count and a direction opposing the platen movement. A digital to analog converter receives the single supply drive value and outputs a single supply drive voltage signal having a voltage which is a function of the speed of platen movement and a direction opposing the platen movement. A single supply amplifier amplifies the single supply voltage drive signal to produce two motor drive signals that can create a voltage difference across a motor which is a function of the speed of platen movement and a direction opposing the platen movement. The digital to analog converter further outputs a fixed reference voltage signal that establishes a mid-position bias offset for the single supply amplifier.

Further embodiments, features, and advantages of the present inventions, as well as the structure and operation of the various embodiments of the present invention, are described in detail below with reference to the accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention. In the drawings.

Figure 1:
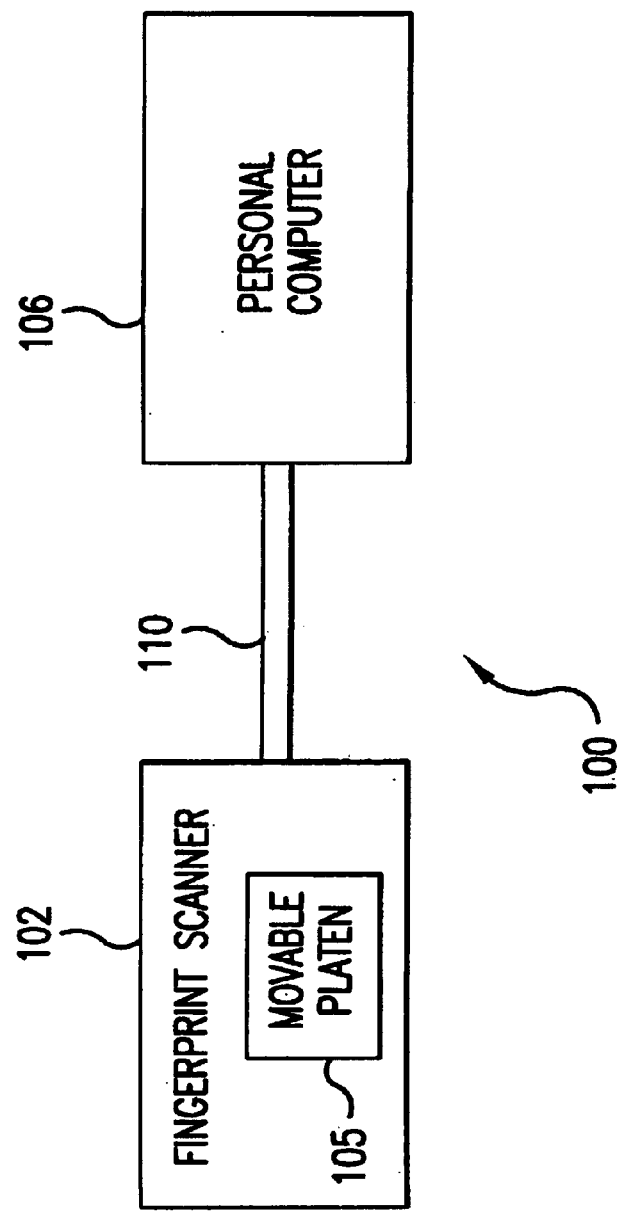
FIG. 1 is a diagram of an example fingerprint scanner coupled to a personal computer according to one embodiment of the present invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the present invention would be of significant utility.

OVERVIEW

The present invention controls movement of a platen during a live scan. To capture a fingerprint image, a platen moves over an optical imaging area in response to finger movement. The present invention then applies a counter force that counters the platen movement. The counter force which is applied helps prevent a user from moving a finger too rapidly during the live scan. Wear or damage resulting from an excessive high-speed movement of the platen is avoided. A high-quality fingerprint image is also obtained with less training and experience in live scan fingerprinting, as a user cannot easily move a platen too rapidly during the live scan.

TERMINOLOGY

To more clearly delineate the present invention, an effort is made throughout the specification to adhere to the following term definitions consistently.

The term "finger" refers to any digit on a hand including, but not limited to, a thumb, an index finger, middle finger, ring finger, or a pinky finger.

The term "live scan" refers to a scan of any type of fingerprint image by a fingerprint scanner. A live scan can include, but is not limited to, a scan of a finger, a finger roll, a flat finger, slap print of four fingers, thumb print or palm print.

The term "fingerprint scanner" is any type of scanner which can obtain an image of all or part of one or more fingers in a live scan including, but not limited to, a tenprint scanner. A "tenprint scanner" is a scanner that can capture images representative of ten fingers of a person. The captured images can be combined in any format including, but not limited to, an FBI tenprint format.

The term "platen" refers to a component that include an imaging surface upon which at least one finger is placed during a live scan. A platen can include, but is not limited to, an optical prism, set of prisms, or set of micro-prisms.

The term "a direction that counters the platen movement" can include, but is not limited to, any direction other than the direction along which the platen moves. For example, a direction counter to the platen movement can include, but is not limited to, a direction perpendicular to the platen movement direction, such as when a braking pressure is applied, or a direction opposite to the platen movement, such as when a velocity motor control drive signal is applied to oppose platen movement.

EXAMPLE FINGERPRINT SCANNER SYSTEM

FIG. 1 illustrates a high-level block diagram of an identification system 100 according to the present invention. Identification system 100 includes a fingerprint scanner 102, a personal computer 106, and an interface link 110. Interface link 110 couples fingerprint scanner 102 to personal computer 106. Interface link 110 can be any type of communications link, including a wired or wireless communications link.

Fingerprint scanner 102 includes a movable platen 105. In general, fingerprint scanner 102 can be any type of fingerprint scanner that includes a movable platen. Personal computer 106 can also be any type of off-the-shelf computer, including but not limited to, desktop computers, palm or handheld computers, and laptop computers. The present invention can also be used with mid-range computers, high-end computers, or other type of processing units. Interface link 110 can support an IEEE 1394 (FIREWIRE) interface or any other type of communication interface for purposes of this invention.

Figure 2:
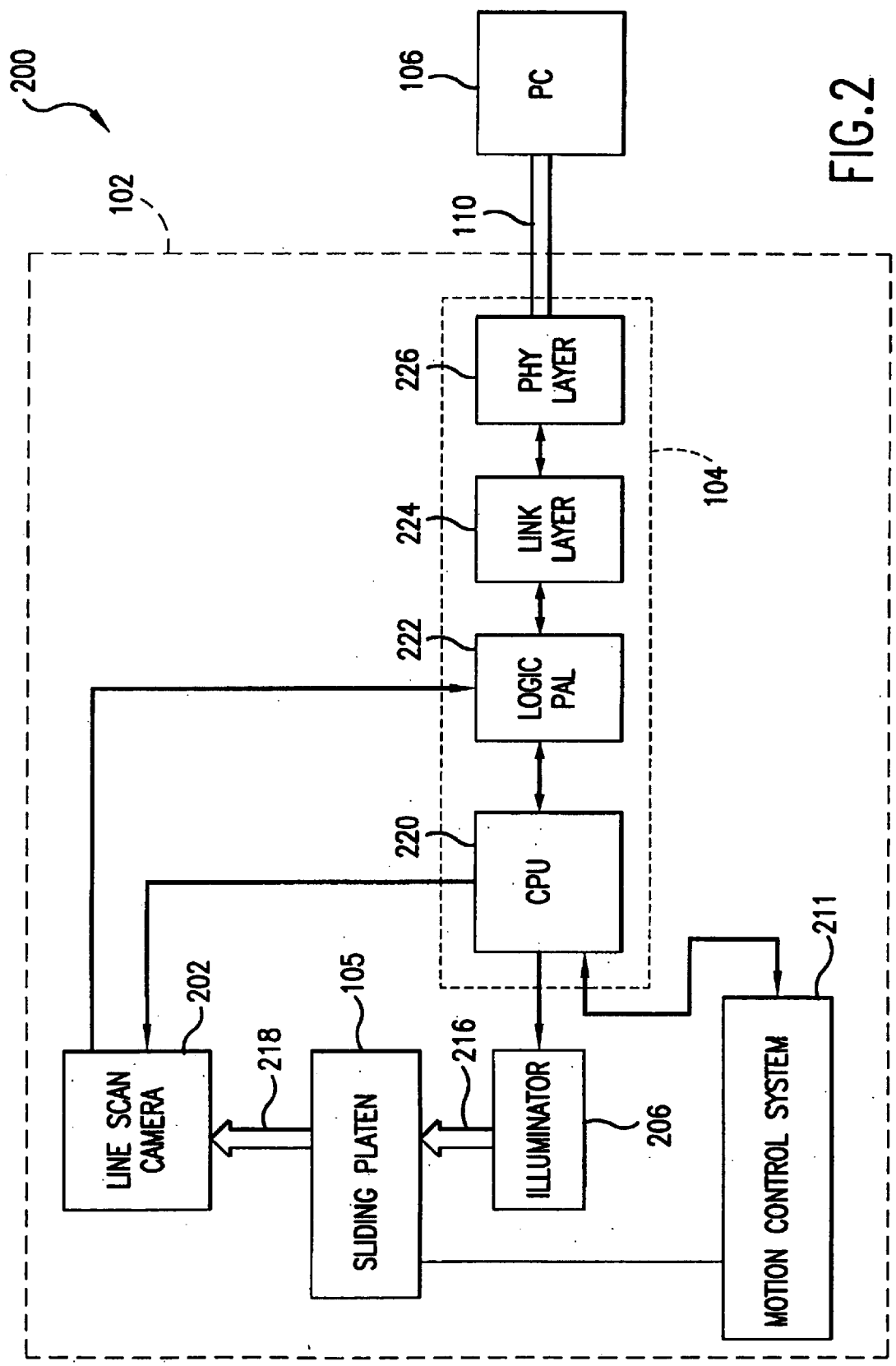
FIG. 2 is a diagram of that shows the example fingerprint scanner of FIG. 1 with a motion control system in further detail.

FIG. 2 is a diagram of identification system 100 in which fingerprint scanner 102 is shown in further detail according to an embodiment of the present invention. Fingerprint scanner 102 includes a line scan camera 202, a movable (sliding) prism 105, and an illuminator 206. A motion control system 211 is mechanically coupled to movable platen 105. A first interface card 204 is coupled to the illuminator 206, line scanning camera 202, and motion control system 211. Interface card 204 provides communication between the fingerprint scanner 102 and PC 106 over interface link 110. Interface card 204 includes CPU 220, logical programmable array logic (PAL) 222, link layer 224 and physical layer (PHY) 226. In one embodiment, interface card 204 comprises an IEEE 1394 (FIREWIRE) interface. See, for example, the US Patent Application entitled "System and Method for Transferring a Packet with Position Address and Line Scan Data Over an Interface," Ser. No. 09/425,949,by W. Scott et al., filed concurrently herewith and incorporated in its entirety herein by reference.

EXAMPLE OPTIMAL MECHANICAL SYSTEM FOR A MOVABLE PLATEN

Figure 3:
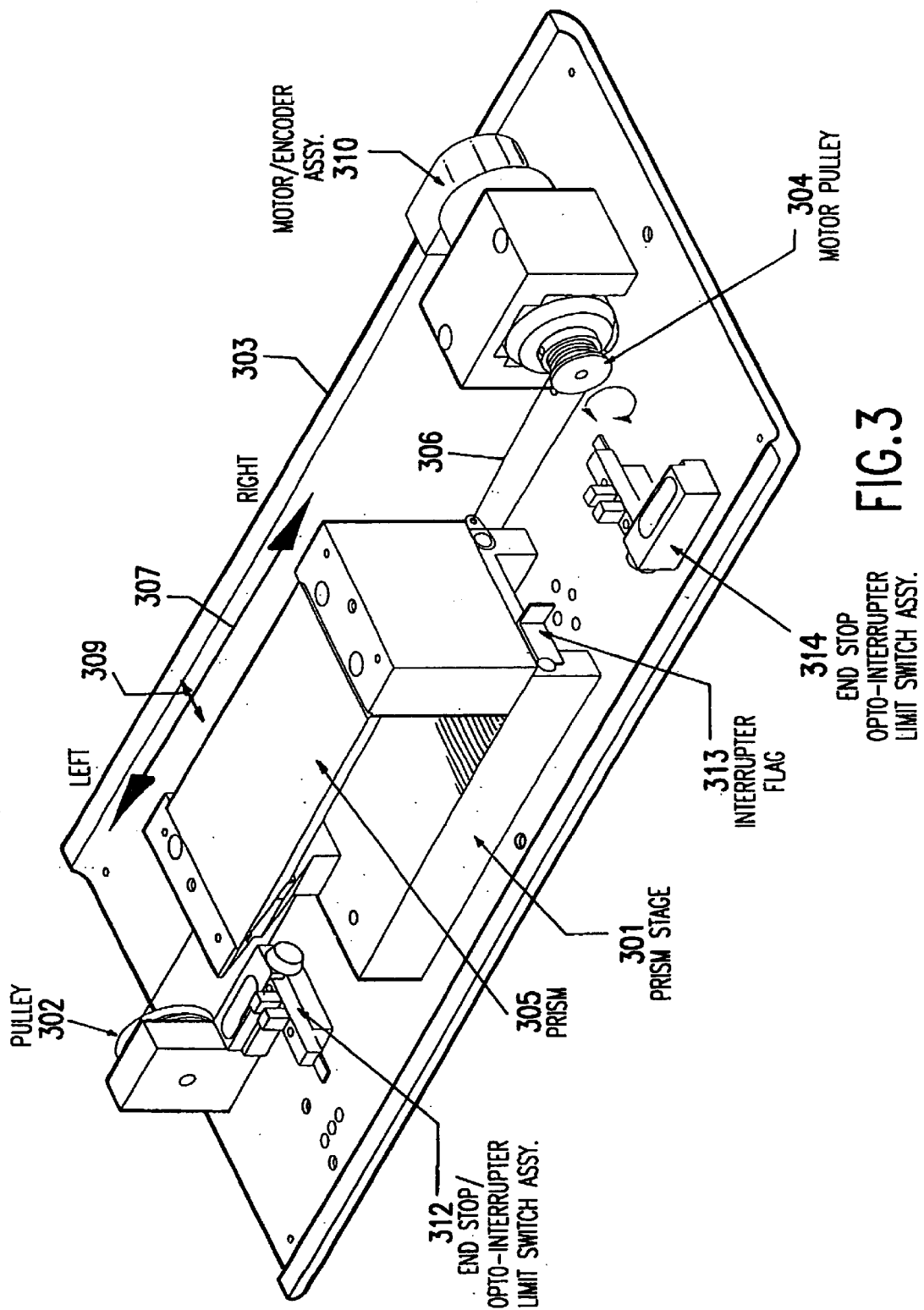
FIG. 3 is a diagram that illustrates mechanical components related to platen movement control in the fingerprint scanner of FIG. 1.

FIG. 3 is a diagram that illustrates optical and mechanical components related to platen movement control in one embodiment of the present invention. As shown in FIG. 3, in one example movable platen 105 consists of a single prism 305. Prism 305 is mounted on a prism stage 301. Prism stage 301 is mechanically coupled to a drive motor and encoder assembly 310. A guideline 306 is attached to prism stage 301 and wound-around pulley 302 and motor pulley 304. Pulley 302 and motor pulley 304 each rotate in accordance with movement of prism stage 301.

During a live scan, one or more fingers are generally placed on the top surface of prism 305. The finger(s) are generally aligned along a direction 309. To take a roll print or slap print, the finger is rolled along the surface of prism 305. Prism 305 then moves in response to the finger movement along a lateral axis 307. This direction can be a left or right direction along the lateral axis. In particular, as shown in FIG. 3, when the finger rolls to the right, prism 305 moves in a left direction along lateral axis 307. Conversely, when a finger is rolled to the left, the prism 305 moves in a right direction along lateral axis 307. This movement of prism 305 causes guideline 306 to move and pulley 302 and motor pulley 304 to rotate. Rotation of motor pulley 304 is detected by a position encoder in motor encoder assembly 310.

According to a further feature of the invention, end stops and opto-interrupter switch assemblies 312, 314 are provided at the end points of the maximum range of movement of prism 305. In one embodiment, assemblies 312, 314 are mounted on opposite ends of the range of movement of prism 305. Each of these assemblies 312, 314 includes a mechanical end stop and an opto-interrupter limit switch. Interrupter flags are mounted on opposite sides of the prism stage 301. In FIG. 3, interrupter flag 313 is shown on one end of prism stage 301. A similar interrupter flag (not shown) is mounted on the opposite side of prism stage 301. When prism 305 is positioned at an end point of its range of movement, interrupter flag 313 triggers an opto-interrupter limit switch in assembly 314. In particular, the flag moves to break a light beam in the opto-interrupter limit switch in assembly 314. Similarly, when prism stage 301 is moved to an extreme left position, an interrupter flag triggers an opto-interrupter limit switch in assembly 312. Signals from the opto-interrupters can be used to verify that the prism stage 301 has been moved to a desired location at an end point of the range of movement (i.e., left or right) or to indicate that the movement has reached a maximum limit and issue an alarm or other indication.

According to one embodiment of the present invention, a motor in motor encoder assembly 310 is used to drive motor pulley 304 to wind or unwind guideline 306 such that prism stage 301 experiences a counter force to the movement caused by the finger or fingers during a live scan. The force which is applied depends upon a drive signal applied to the motor in motor encoder assembly 310. The control of platen movement during a live scan is described further below with respect to FIGS. 4 through 11.

CONTROL OF PLATEN MOVEMENT

Figure 4:
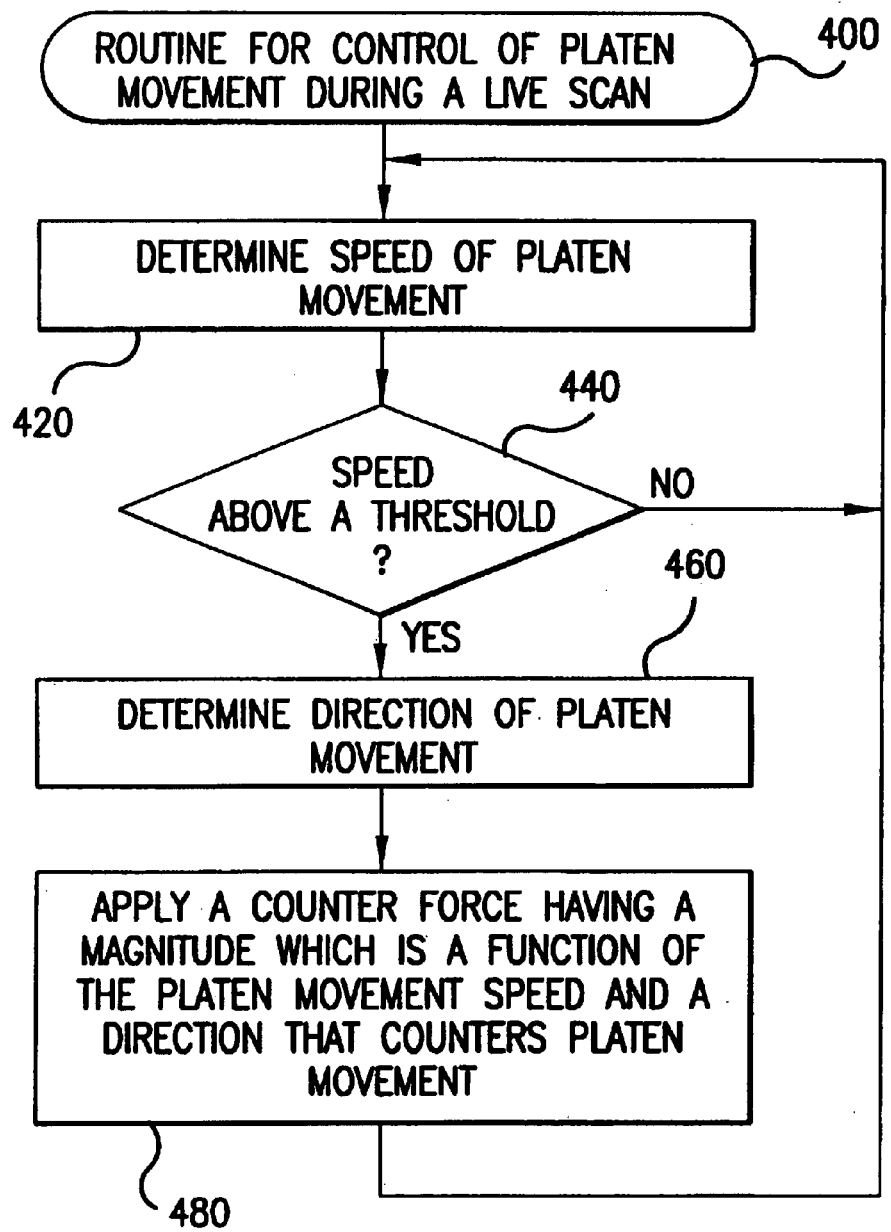
FIG. 4 is flowchart of a routine for control of platen movement during a live scan according to one embodiment of the present invention.

FIG. 4 is a flowchart of a routine for control of platen movement 400 during a live scan according to one embodiment of the present invention (steps 420–480). In step 420, the speed of platen movement is determined. In step 440, a check is made to determine whether the speed of platen movement is above a threshold. If the speed of platen movement is not above a threshold (that is, it is idle or very low), then platen movement control is not applied. If the speed of platen movement is above a threshold, then the direction of the platen movement is determined (step 460). In step 480, a counter force is applied having a magnitude which is a function of the determined platen movement speed and a direction that counters the platen movement.

In this way, the operation of routine 400 acts to prevent excessive movement of the platen during a live scan. As a result, excessive wear or damage is avoided. A high-quality fingerprint image is also guaranteed, as a user cannot easily move the platen too quickly resulting in image drop-out or other image detection problems.

EXAMPLE PLATEN MOVEMENT CONTROL ROUTINE AND SYSTEM

Figure 5:
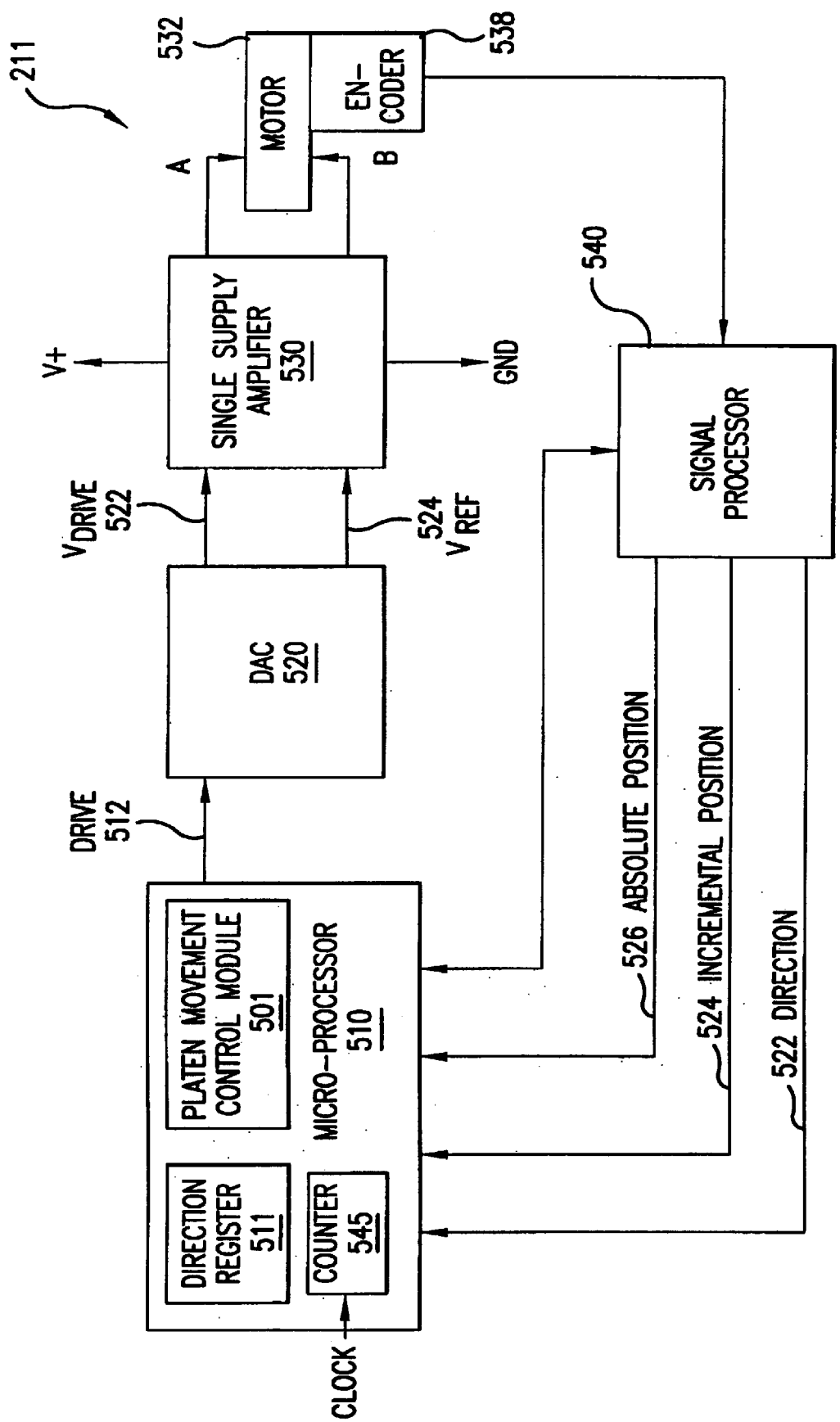
FIG. 5 is a diagram of a motion control system including a single supply amplifier according to one embodiment of the present invention.
Figure 6:
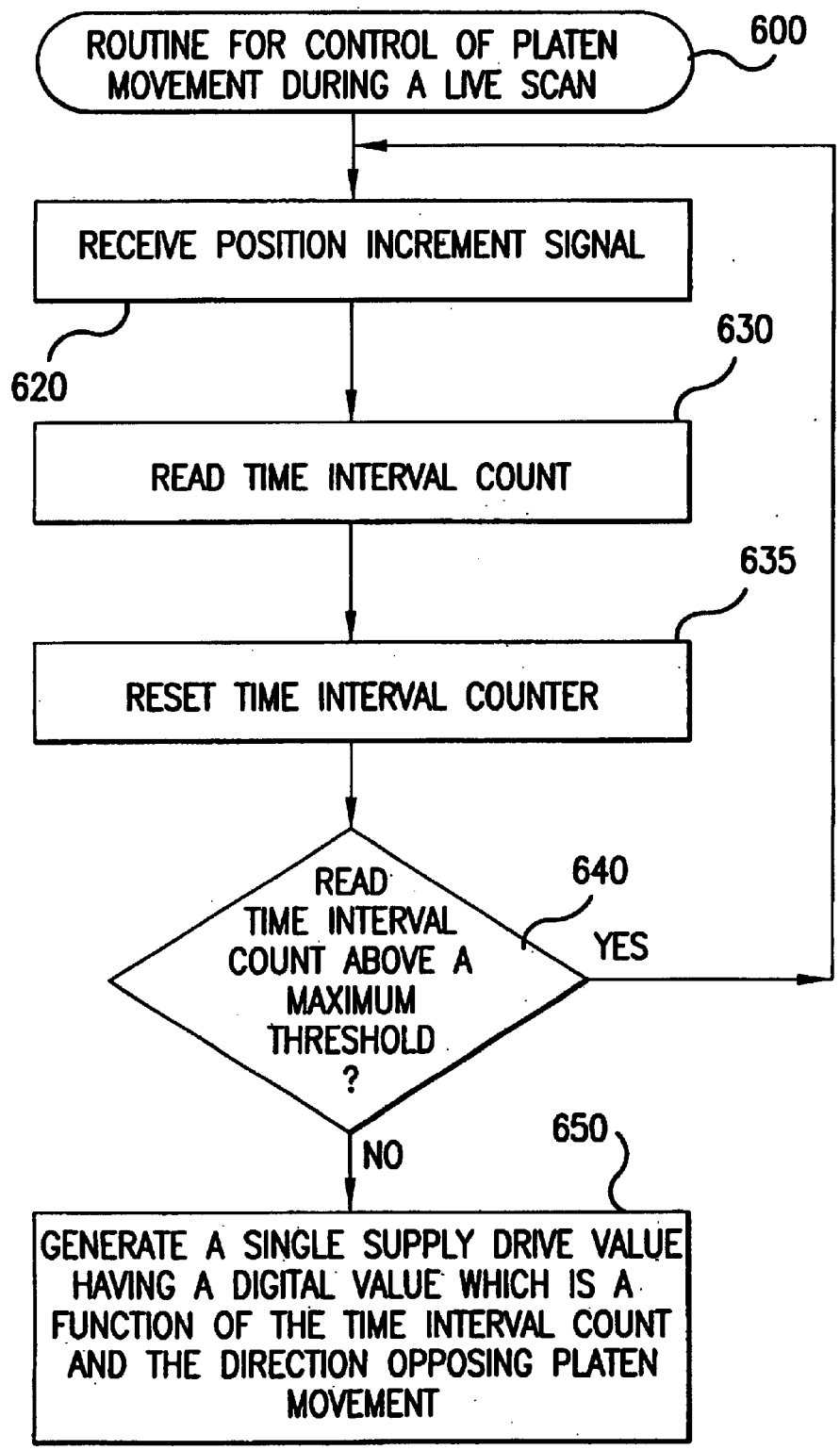
FIGS. 6 and 7 are flowcharts of a routine for control of platen movement during a live scan that can be carried out by a platen movement control module in the motion control system of FIG. 5 according to one embodiment of the present invention.
Figure 7:
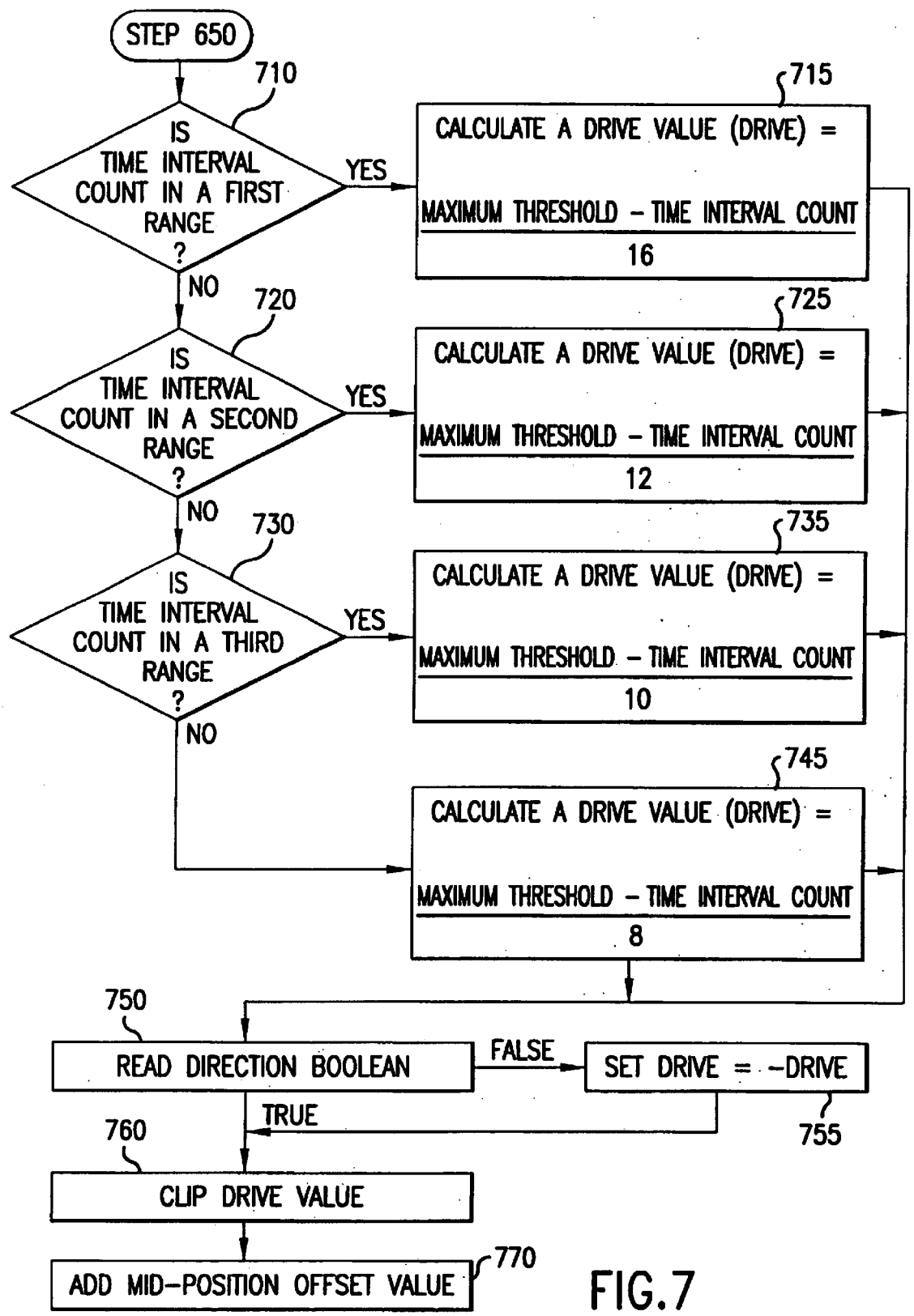
Figure 8:
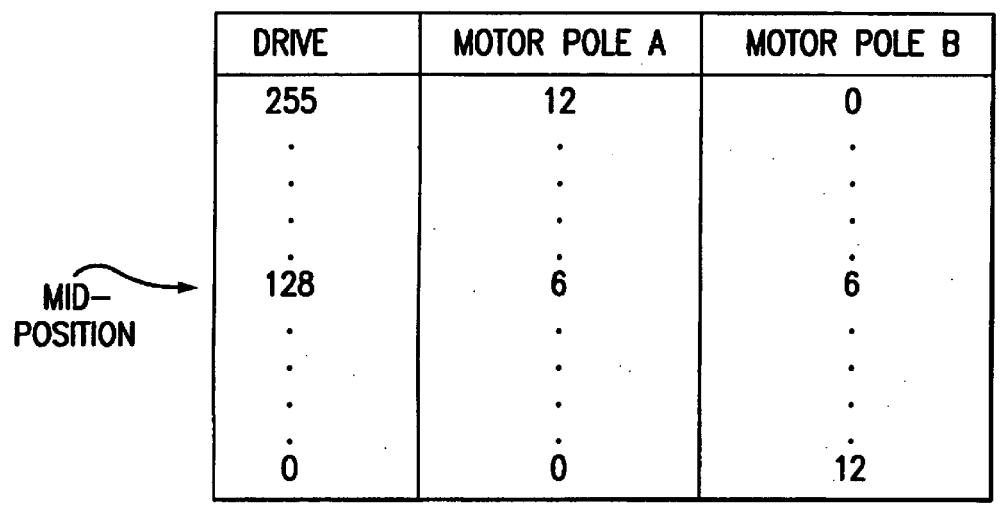
FIG. 8 is a chart that shows the relationship between a digital motor drive value with a mid-position bias and the voltages across two poles A and B of a motor in the motion control system of FIG. 5 in one example of the present invention.
Figure 9:
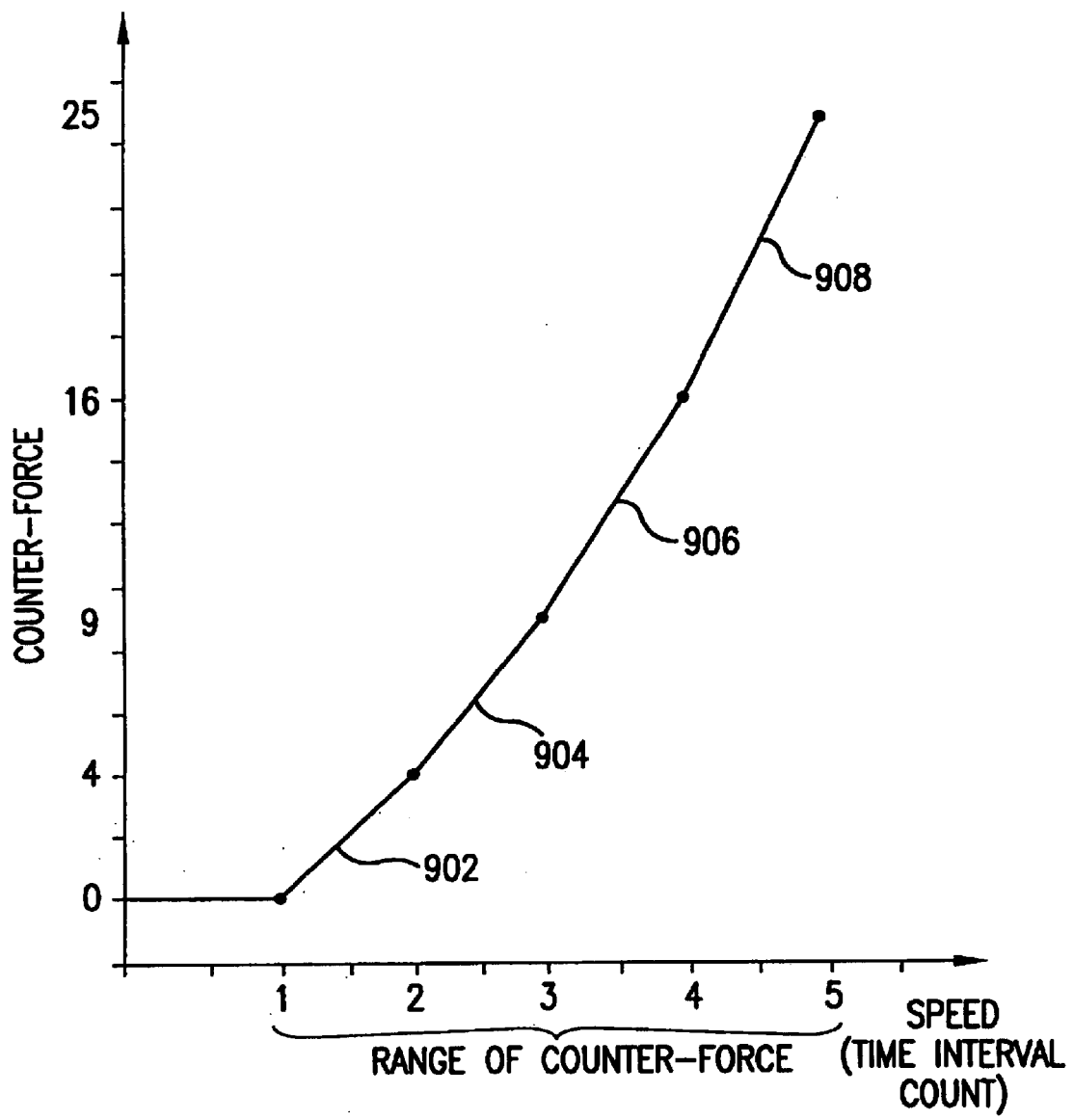
FIG. 9 is a graph that plots a counter force applied as function of platen movement speed according to one example of the present invention.
Figure 10:
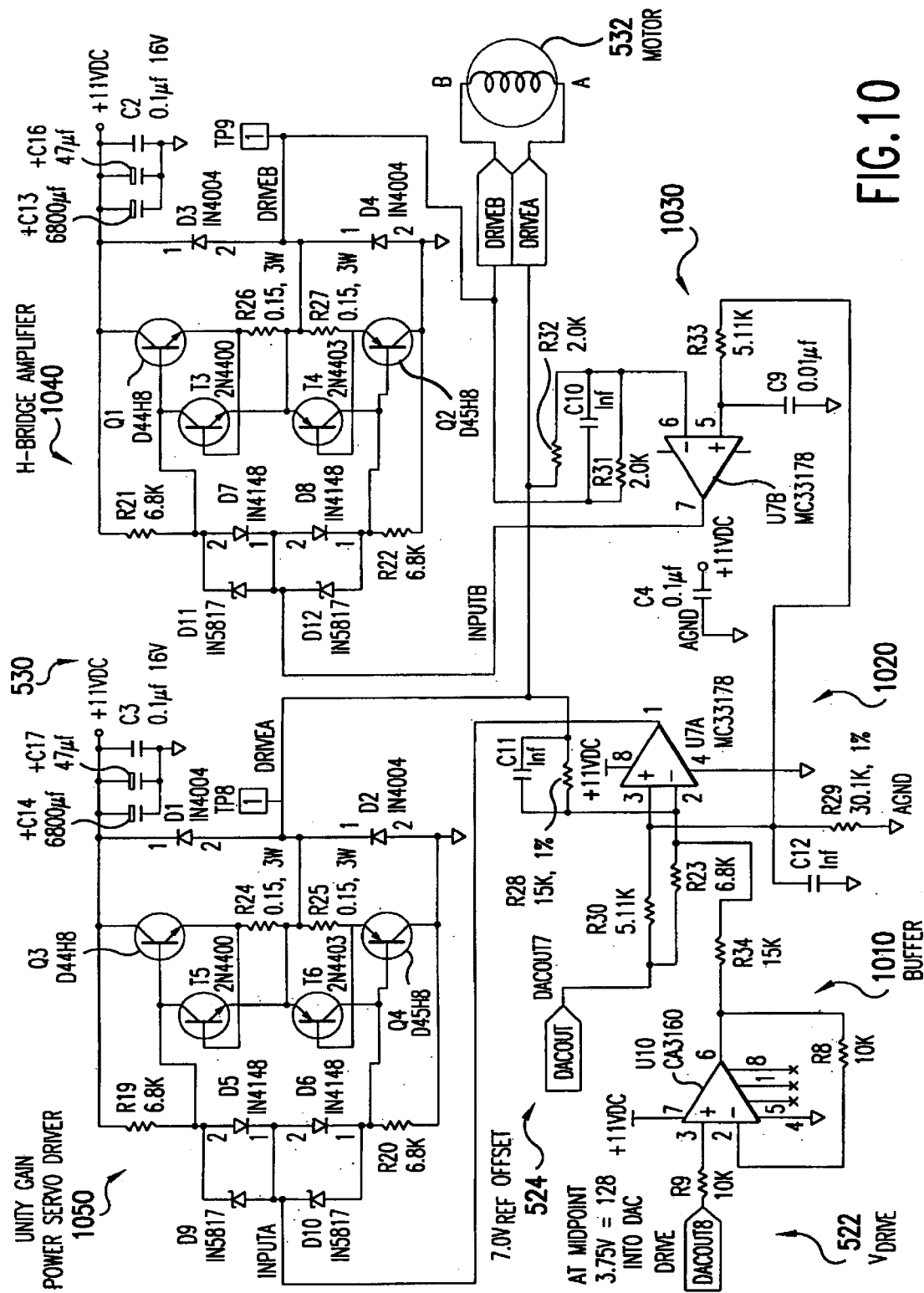
FIG. 10 is a schematic diagram of a single supply amplifier according to an example implementation of the present invention.
Figure 11:
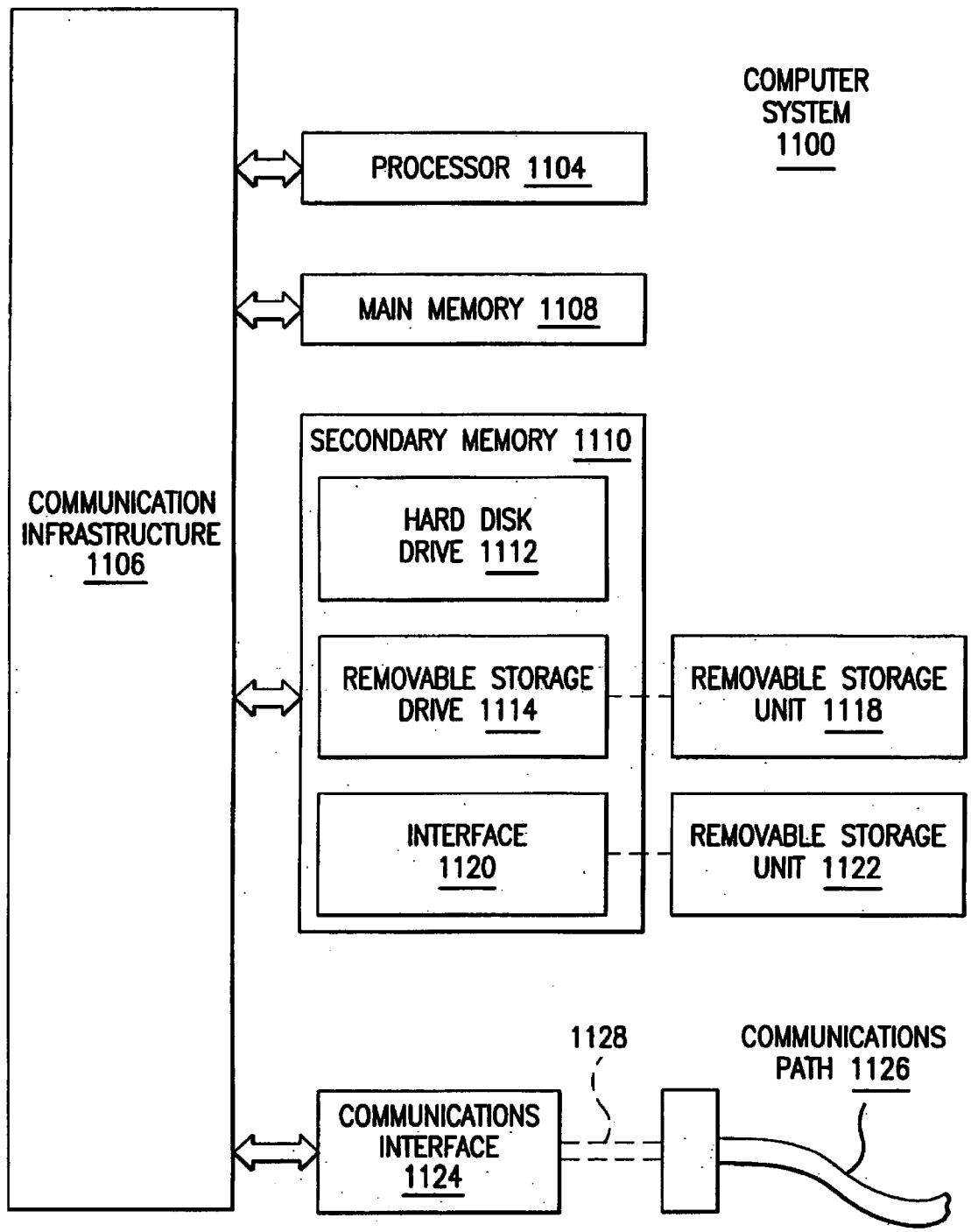
FIG. 11 is a diagram of an example computer system that can be used in a software embodiment of the present invention.

The operation of the present invention and routine 400 is described in further detail below with respect to an example implementation of motion control system 211 and a routine for control of platen movement 600. In particular, FIG. 5 shows a diagram of motion control system 211 that includes a single supply amplifier according to one embodiment of the present invention. FIGS. 6 and 7 are flowcharts of a routine for control of platen movement during a live scan that can be carried out by a platen movement control module in the motion control system 211 of FIG. 5. FIG. 10 is a schematic diagram of a single supply amplifier used in motion control system 21 1, according to one example implementation of the present invention. FIGS. 8 and 9 are diagrams that further illustrate the principles of the present invention. FIG. 11 is an example computer system that can support software and computer program embodiments according to the present invention.

In the interest of brevity, FIGS. 5–11 are described with respect to an example embodiment of the present invention. This description is illustrative, and is not necessarily intended to limit the present invention. For example, routine 400 can be used with a different type of structure, as would be apparent to a person skilled in the art given this description. Similarly, motion control system 211 is not necessarily limited to the single supply amplifier 530 that is shown in FIG. 10. Other circuit arrangements can be used.

FIG. 5 shows motion control system 211 according to an embodiment of the present invention. Motion control system 211 includes a microprocessor 510, digital analog converter (DAC) 520, single supply amplifier 530, motor 532, position encoder 538, and signal processor 540. Microprocessor 510 includes platen movement control module 501, a Boolean register 511, and a counter 545. In one embodiment, platen movement control module 501 initiates control operations and carries out routine 600. Platen movement control module 501 can be implemented in software, firmware, hardware, or any combination thereof.

The operation of platen movement control module 501 is now described with respect to routine 600. In step 620, microprocessor 510 receives a position increment signal 524 from signal processor 540. Position increment signal 524 represents an incremental change in the position of encoder 538. In particular, encoder 538 outputs to signal processor 540 a direction signal, an incremental position signal, and an absolute position signal in response to movement of prism 305. The incremental position signal output from encoder 538 passes to signal processor 540 for debounce and other optional signal processing. In one example, signal processor 540 is an HCTL-2020 chip available from Hewlett-Packard. Signal processor 540 then outputs position increment signal 524 to microprocessor 510.

Position incremental signal 524 is essentially a pulse train having a frequency representative of changes in position of encoder 538. For example, an optical incremental encoder can be used as encoder 538. Other types of position encoders can be used, including but not limited to capacitive, magnetic or other types of position encoders. Further, the frequency of the incremental position signal 524 can be adjusted by changing the type of encoder or through signal processing techniques depending upon the desired sensitivity of movement control which is desired.

Signal processor 540 can also output a direction signal 522 to microprocessor 510. Microprocessor 510 then sets the Boolean register 511 to a true or false value representative of the direction of movement of prism 305 (right or left) along lateral axis 307. Alternatively, programmable array logic (PAL) can be provided separately to track direction instead of using register 511 in microprocessor 510. Signal processor 540 can also output an absolute position signal 526 to microprocessor 510 for use in verifying or setting the position of the prism 305 to a desired location.

In step 630, a time interval count is read in response to the received position incremental signal 524. In particular, microprocessor 510 reads the contents of counter 545. Counter 545 is a simple counter that counts the number of clock pulses received from a time source such as a high-frequency crystal oscillator (not shown). In step 635, counter 545 is then reset to zero.

In this arrangement, then, the time interval count, read in step 630, represents the velocity of the prism 305 at a moment during the live scan. Velocity, or speed, is equal to a change in position divided by a change in time. In this case, the velocity of prism 305 is equal to a change in the position of encoder 538 divided by a change in time. The change in position of encoder 538 is determined by the incremental position in position incremental signal 524. The change in time is represented by the time interval count, which is maintained in counter 545. In the implementation described with respect to step 620–635 and shown in FIG. 5, each tick of incremental position signal 524 represents a relatively fixed change in position. Accordingly, the change in time represented by a counter 545 is inversely proportional to the velocity or speed of prism 305 along the lateral axis 307.

In step 640, the time interval count read in step 630 is checked to see if the time interval count is above a maximum threshold. If the time interval count is above a maximum threshold (meaning the speed is zero or too low), then no platen movement control is initiated. On the other hand, if the time interval count read in step 630 is not above a maximum threshold (meaning the speed of platen movement is sufficiently fast to warrant control), then step 650 is carried out.

In step 650, a single supply drive value 512 is generated. In particular, platen movement control module 501 generates drive value 512 having a digital value which is a function of the time interval count read in step 630 and the direction opposing platen movement. Step 650 is described further below with respect to step 710 through 770 in FIG. 7.

Of course, the above description of steps 620–635 cover one example for measuring speed in step 420. Other speed measuring techniques can be used as would be apparent to a person skilled in the given this description. For example, step 420 can be carried out such that at every fixed time interval, changes in position are detected. In this case, the detected change in position at a fixed time interval would be proportional to the velocity or speed of prism 305 along the lateral axis 307.

To determine an appropriate level of control, the time interval count read in step 630 is compared against one or more thresholds. Basically, the time interval count is divided into ranges. The time interval count can then be evaluated based on different thresholds to determine into which range the time interval count (that is, the speed of the movable platen) falls. In other words, as shown in FIG. 9, the range of the determined platen movement speed can be subdivided into n subdivisions, where n is a whole number equal to or greater than 2. The magnitude of counter force which can be applied is determined based on n respective linear functions, each of the n functions have a different slope such that the slopes of the n functions increase across the range of platen movement speed.

In the example implementation shown in FIG. 9, the determined platen movement speed (or time interval count)

has a range in which a counter force can be applied that is subdivided into first through fourth subdivisions (1–5). The magnitude of counter force which can be applied is then determined based on first through fourth respective linear functions 902, 904, 906, 908, in the plot shown in FIG. 9. Each of the functions 902–908 has a different slope, such that the slopes increase across the range of platen movement speed at an approximately exponential function. Of course, this example is illustrative and not intended to limit the present invention. Any number of functions can be used having different or equal slopes. The different slopes can increase across the range of platen movement speed at an approximately exponential or exponential function, approximately linear or linear function, or any other type of function depending on a particular application.

In the example implementation of FIG. 7 four ranges are used. In step 710, a determination is made on whether the time interval count read in step 630 is in a first range. If the time interval count is in the first range, then a drive value ("drive") is set equal to a maximum threshold minus the read time interval count divided by 16 (step 715). Control then goes to step 750. If the time interval count is not in a first range, then a check is made to determine whether the time interval count is in a second range. (Step 720.) If the time interval count is in a second range, then a drive value (drive) is set equal to a maximum threshold minus the read time interval count divided by 12 (step 725). Control then returns to step 750.

If the time interval count is not in a second range, then a determination is made on whether the time interval count is in a third range. (Step 730.) If the time interval count is in the third range, then a drive value (drive) is set equal to a maximum threshold minus the read time interval count divided by 10 (step 735). Control then returns to step 750. If the time interval count is not in the third range, then it is assumed that the time interval count must fall in a fourth range. Accordingly, a drive value (drive) is set equal to a maximum threshold minus the read time interval count divided by 8 (step 745)). Alternatively, a determination step can be made to determine precisely that the time interval count read in step 630 is within a fourth range prior to prior to performing step 745.

In step 750, microprocessor 510 reads Boolean register 511 (step 750). If Boolean register 511 indicates a false value, then the calculated drive value calculated in step 715, 725, 735 or 745, is set to minus value (negative drive) (step 755). Control then returns to step 760. If Boolean register 511 indicates a direction value true, then control passes to step 760.

In step 760, the drive value (drive) is clipped to a desired range of values. Of course, this clipping is optional and can be omitted for relatively stable applications.

In step 770, a mid-position offset value is added to the drive value to obtain the single supply drive signal 512. In this way, single supply drive value 512 has a digital value (drive) which is a function of a time interval count and a direction opposing the platen movement. Single supply drive value 512 is applied to DAC 520. DAC 520 receives the single supply drive value 512 and outputs a single supply drive voltage signal 522 and a fixed reference voltage signal 524. Single supply drive voltage signal 522 has a voltage $V_{DRIVE}$ which is a function of the speed of the platen movement and a direction opposing the platen movement. Fixed reference voltage signal 524 has a voltage $V_{REF}$ that establishes a mid-position bias offset. Single supply amplifier 530 then amplifies single supply voltage drive signal 522 to produce two motor drive potentials that create a voltage difference across motor 532 at poles A and B. The voltage difference across motor 532 then is a function of the speed of platen movement and a direction opposing the platen movement.

One feature of the motion control system of the present invention is that a single supply drive value 512 can be used to generate a single supply voltage drive signal 522. This single supply drive voltage 522 can still create voltage differences across the motor which are a function of the speed of platen movement and a direction opposing the platen movement. For example, FIG. 8 shows a table of representative drive values 512 that can vary between zero and 255. The intermediate value 128 then represents a mid-position bias offset. When a drive value is equal to zero, one of the motor poles A has a value of zero volts while motor pole B has a value of 12 volts. Conversely, when the drive value is equal to 255, motor pole A has a value of 12 volts while motor pole B has a value of zero volts. In the intermediate position, where the drive value is equal to 128, motor poles A and B both have a value of six volts.

FIG. 10 shows a schematic diagram of an example implementation of a single supply amplifier 530. This implementation is illustrative and not intended to limit the present invention. Other types and designs of single supply amplifiers can be used, as will be apparent to a person skilled in the art given this description. In this example, single supply amplifier 530 includes a buffer 1010, operational amplifiers 1020, 1030, an H-bridge amplifier 1040, and a unity gain power servo-driver 1050. Voltage drive signal 522 is applied to buffer 1010. Voltage reference signal 524 and the output of buffer 1010 are applied to an operation amplifier 1020. The output of operation amplifier 1020 is coupled to unity gain power servo-driver 1050. Unity gain power servo-driver 1050 is further coupled to a probe DRIVE A at pole A of motor 532. Operation amplifier 1030 is coupled to operation amplifier 1020 and drives A and B. Operation amplifier 1030 provides, as an output, an input B to H-bridge amplifier 1040. H-bridge amplifier 1040 then provides an output drive B to a probe drive B at pole B of motor 532.

EXAMPLE COMPUTER SYSTEM

As described above, the present invention can be implemented in software, firmware, hardware, or any combination thereof. FIG. 11 shows an example computer system that can support a software embodiment according to the present invention. In particular, a platen movement control module 501 can be run as software on computer system 1100.

The computer system 1100 includes one or more processors, such as processor 1104. One or more processors 1104 can execute software implementing routine 100 as described above. Each processor 1104 is connected to a communication infrastructure 1102 (e.g., a communications bus, cross-bar, or network). Various software embodiments are described in terms of this exemplary computer system. After reading this description, it will become apparent to a person skilled in the relevant art how to implement the invention using other computer systems and/or computer architectures.

Computer system 1100 also includes a main memory 1108, preferably random access memory (RAM), and can also include a secondary memory 1110. The secondary memory 1110 can include, for example, a hard disk drive 1112 and/or a removable storage drive 1114, representing a floppy disk drive, a magnetic tape drive, an optical disk drive, etc. The removable storage drive 1114 reads from and/or writes to a removable storage unit 1118 in a well known manner. Removable storage unit 1118 represents a floppy disk, magnetic tape, optical disk, etc., which is read by and written to by removable storage drive 1114. As will be appreciated, the removable storage unit 1118 includes a computer usable storage medium having stored therein computer software and/or data.

In alternative embodiments, secondary memory 1110 may include other similar means for allowing computer programs or other instructions to be loaded into computer system 1100. Such means can include, for example, a removable storage unit 1122 and an interface 1120. Examples can include a program cartridge and cartridge interface (such as that found in video game devices), a removable memory chip (such as an EPROM, or PROM) and associated socket, and other removable storage units 1122 and interfaces 1120 which allow software and data to be transferred from the removable storage unit 1122 to computer system 1100.

Computer system 1100 can also include a communications interface 1124. Communications interface 1124 allows software and data to be transferred between computer system 1100 and external devices via communications path 1126. Examples of communications interface 1124 can include a modem, a network interface (such as Ethernet card), a communications port, etc. Software and data transferred via communications interface 1124 are in the form of signals which can be electronic, electromagnetic, optical or other signals capable of being received by communications interface 1124, via communications path 1126. Note that communications interface 1124 provides a means by which computer system 1100 can interface to a network such as the Internet.

The present invention can be implemented using software running (that is, executing) in an environment similar to that described above with respect to FIG. 11. In this document, the term "computer program product" is used to generally refer to removable storage unit 1118, a hard disk installed in hard disk drive 1112, or a carrier wave or other signal carrying software over a communication path 1126 (wireless link or cable) to communication interface 1124. A computer useable medium can include magnetic media, optical media, or other recordable media, or media that transmits a carrier wave. These computer program products are means for providing software to computer system 1100.

Computer programs (also called computer control logic) are stored in main memory 1108 and/or secondary memory 1110. Computer programs can also be received via communications interface 1124. Such computer programs, when executed, enable the computer system 1100 to perform the features of the present invention as discussed herein. In particular, the computer programs, when executed, enable the processor 1104 to perform the features of the present invention. Accordingly, such computer programs represent controllers of the computer system 1100.

In an embodiment where the invention is implemented using software, the software may be stored in a computer program product and loaded into computer system 1100 using removable storage drive 1114, hard drive 1112, or communications interface 1124. Alternatively, the computer program product may be downloaded to computer system 1100 over communications path 1126. The control logic (software), when executed by the one or more processors 1104, causes the processor(s) 1104 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

CONCLUSION

The present invention has been described with respect to an example movable prism 305 in fingerprint scanner 102. In general, the present invention can be used in any type of fingerprint scanner with a movable platen, and is not intended to be limited to this particular environment.

While specific embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for control of platen movement during a live scan, wherein the direction and speed of the movement is initiated in response to movement of a finger during the live scan, comprising the steps of:
   (A) determining the speed of platen movement;
   (B) determining the direction of platen movement;
   (C) applying a variable voltage drive signal to a motor to generate a counter force when the determined speed of platen movement is above a minimum threshold value, the variable voltage drive signal having a voltage which is a function of the determined platen movement speed and a direction that counters the platen movement in the determined direction, and
   (D) applying the counter fource through the motor to control the platen movement.

2. The method of claim 1, wherein the variable voltage drive signal has a magnitude which is an approximately linear function or a linear function of the determined platen movement speed.

3. The method of claim 1, wherein the variable voltage drive signal has a magnitude which is an approximately linear function or a linear function of the determined platen movement speed.

4. The method of claim 1, wherein the determined platen movement speed has a range in which a drive signal can be applied that is subdivided into n sub-divisions, where n is a whole number equal to or greater than 2, and the magnitude of drive signal, which can be applied to the motor in said applying step (C) is determined based on n respective linear functions, each of the n functions having a different slope such that the slopes of the n functions increase across the range of platen movement speed.

5. The method of claim 1, wherein the determined platen movement speed has a range in which a counter force can be applied that is subdivided into n sub-divisions, and the magnitude of drive signal which can be applied to the motor in said applying step (C) is determined based on first through fourth respective linear functions, each of the first through functions having a different slope such that the slope of the first through fourth functions increase across the range of platen movement speed at an approximately exponential function.

6. The method of claim 1, wherein said applying step (C) comprises generating a single supply drive signal having a voltage which is a function of a time interval count and a direction opposing the platen movement.

7. The method of claim 1, wherein said speed step (A) comprises reading a time interval count in response to receiving a position incremental signal.

8. The method of claim 7, wherein said applying step (C) comprises the steps of:
- when the determined platen movement speed is in a first range, calculating a drive signal value equal to the difference between a maxium threshold and the read time interval count divided by 16 plus a mid-position bias offset;
- when the determined platen movement speed is in a second range,
- calculating a drie signal value equal to the difference between a maximum three and the read time interval count divided by 12 plus a mid-position bias offset;
- when the determined platen movement speed is in a third range, calculating a drive signal value equal to the difference between maximum threshold and the read time inteval count divided by 10 plus a mid-position bias offset; and
- when the determined platen movement speed is in a fourth range, calculating a drive signal value equal to the difference between a maximum threshold and the read time interval count divided by 8 plus a mid-position bias offset.

9. The method of claim 8, wherein said determining step (b) comprises reading a Boolean value set in response to a direction of platen movement along an axis perpendicular to the up-to-crease direction of a fingerprint.

10. The method of claim 1, wherein the speed of platen movement in a linear speed.

11. A system for control of platen movement during a live scan, wherein the direction and speed of the movment is initiated in response to movement of a finger during the live scan, comprising:
- (A) means for determining the speeed of platen movement;
- (B) means for determining the direction of platen movement;
- (C) means for applying a variable voltage drive signal to a motor to generate a counter fource when the determined speed of platen movement is above the minimum theshold value, the variable voltage drive signal having a voltage which is a function of the detemined platen movement speed and a direction that counters the platen movement in the determined direction; and
- (D) means for applying the counter force through the motor to control the platen movement.

12. The system of claim 11, wherein means for determining the speed of platen movement includes a means for determining the linear speed of platen movement.

* * * * *